United States Patent
Ogata et al.

(10) Patent No.: US 6,768,708 B1
(45) Date of Patent: Jul. 27, 2004

(54) SIGNAL RECORDING APPARATUS

(75) Inventors: Hitoshi Ogata, Sakai (JP); Takao Terashima, Kyotanabe (JP); Tomohiro Yamada, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/544,903

(22) Filed: Apr. 7, 2000

(30) Foreign Application Priority Data

Apr. 9, 1999 (JP) .......................................... 11-102926

(51) Int. Cl.[7] ............................................. G11B 27/36
(52) U.S. Cl. ................................ 369/53.18; 369/53.37
(58) Field of Search ........................... 369/53.18, 53.3, 369/59.25, 59.26, 53.26, 53.42, 265, 53.37; 396/265; 348/372

(56) References Cited

U.S. PATENT DOCUMENTS

| | | | |
|---|---|---|---|
| 4,003,093 A | 1/1977 | Satoh | 360/137 |
| 4,982,220 A * | 1/1991 | Akasaka | 396/265 |
| 5,544,138 A * | 8/1996 | Bajorek et al. | 369/53.42 |
| 5,638,307 A | 6/1997 | Kamimura et al. | 364/707 |
| 5,978,921 A * | 11/1999 | Ryu | 713/300 |
| 6,016,296 A * | 1/2000 | Kim | 369/53.18 |
| 6,266,487 B1 * | 7/2001 | Sasaki et al. | 396/277 |
| 6,351,287 B1 * | 2/2002 | Sakaegi et al. | 348/372 |

FOREIGN PATENT DOCUMENTS

| | | |
|---|---|---|
| EP | 0 470 545 | 2/1992 |
| JP | 52-104218 | 9/1977 |
| JP | 5-54517 | 3/1993 |
| JP | 5-054517 | 3/1993 |
| JP | 5-111170 | 4/1993 |
| JP | 9-282775 | 10/1997 |
| JP | 9-329653 | 12/1997 |

OTHER PUBLICATIONS

Copy of European Patent Office Communication including European Search Report for corresponding European Patent Application 00107486 dated Apr. 4, 2001.

* cited by examiner

*Primary Examiner*—David Hudspeth
*Assistant Examiner*—Rocio Colon
(74) *Attorney, Agent, or Firm*—Armstrong, Kratz, Quintos, Hanson & Brooks, LLP

(57) ABSTRACT

A signal recording apparatus including a battery voltage detecting circuit. The battery voltage detecting circuit detects the voltage value of a battery. When a record button provided on an operation panel is pressed, a syscon detects, for 160 ms, voltage values given from the battery voltage detecting circuit. The detected voltage values are stored to a DRAM. An average calculated of the voltage values of for 160 ms by using the DRAM. The syscon compares the averaged voltage value with a threshold A that makes it possible for recording for one disk. When the averaged voltage value is equal to or higher than the threshold A, the syscon directly starts recording. When the averaged voltage value is lower than the threshold A, an insufficient remaining capacity of the battery is displayed on a liquid crystal panel by a display controller.

6 Claims, 2 Drawing Sheets

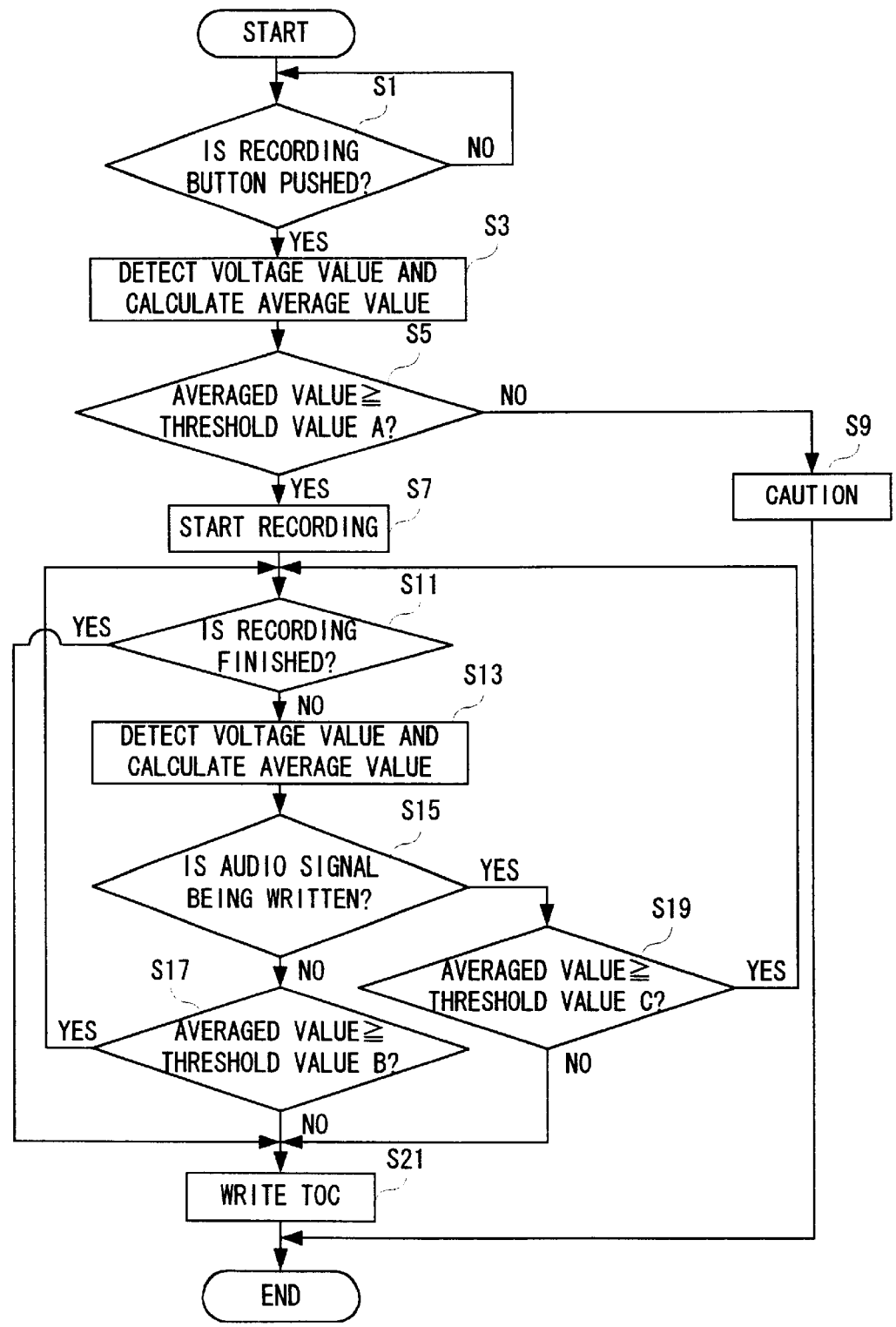

SIGNAL RECORDING APPARATUS

BACKGROUND OF THE INVENTION

1. Field of the invention

This invention relates generally to signal recording apparatuses and, more particularly, to a signal recording apparatus which is driven, for example, by a battery and applied for a recording medium, such as an MD, MO, DVD, CD-R, CD-RW or IC card, in which one or more of data and data management information are recorded.

2. DESCRIPTION OF THE RELATED ART

There is one example of a conventional signal recording apparatus of this kind as disclosed in a publication of Japanese Patent Laid-open No. H5-54517 [G11B 19/00, G11B 20/10, G11B 27/10] laid open on Mar. 5, 1993. In this prior art, if a battery voltage goes below a predetermined threshold during recording digital data onto an magnet-optical disk, TOC (Table Of Contents) information is recorded to the magnet-optical disk, thus finishing the operation. In this manner, effective reproducing of record data is possible by recording TOC information in advance of running down of a battery.

However, if a voltage greater than an actual voltage is detected due to low accuracy, recording of digital data would continue even after the actual voltage becomes lower than the threshold. This however results in a problem that the operation is finished without recording TOC information. On the other hand, if the threshold is given higher in order to avoid such a problem, another problem occurs that the operation comes to an end before fully using the battery thus reducing recording time.

SUMMARY OF THE INVENTION

Therefore, it is a primary object of the present invention to provide a signal recording apparatus which is capable of recording a desired signal completely.

A signal recording apparatus according to the present invention is a signal recording apparatus to be driven by a battery and record one or more of data and management information for managing the data to a recording medium, comprising: a detecting means for detecting a voltage value of the battery; a first comparing means for comparing detection result of the detecting means with a first threshold at which recording is possible to start; a second comparing means for comparing a detection result of the detecting means with a second threshold at which recording is possible to continue; a record starting means for starting to record the data depending upon a comparison result of the first comparing means; and a record continuing means for continuing to record the data depending upon a comparison result of the second comparing means.

The signal recording apparatus is driven by a battery and records one or more of data and data management information to a recording medium. The detecting means detects a voltage value of the battery. The first comparing means compares a detected voltage value with a first threshold that recording is possible to start. Also, the second comparing means compared the detected voltage value with a second threshold that record is possible to continue. The record start means starts to record a signal to the recording medium depending on a comparison result of the first comparing means. During recording of data, the record continuing means continues the recording depending on a comparison result of the second comparing means. In this manner, it is possible to start and continue data recording depending on a battery voltage value.

According to the invention, when a voltage value is in that recording is possible to start, recording of data is started thus preventing the recording from finishing in the course thereof. It is therefore possible to completely record a desired signal.

For this reason, the first threshold is set at a value that makes it possible to complete recording to the recording medium. In this case, the second management information recording means, when data recording is completed, records management information about all the data having been recorded before the completion of recording. Due to this, it is possible to positively reproduce all the recorded data.

In one aspect of the invention, a signal recording apparatus further comprises a caution means. When the detection result is lower than the first threshold, the caution means gives a caution of remaining capacity insufficiency of the battery. Accordingly, the user can charge or exchange the battery according to the caution.

In one embodiment of the invention, a signal recording apparatus further comprises a interruption means. When the voltage value is lower than the second threshold, the interruption means interrupts recording of data. Where data recording is interrupted in this manner, the first management information recording means records management information about all the data having been recorded before the interruption. Accordingly, even where the battery encounters insufficiency during recording data and finishes the recording in the course thereof, it is possible to reproduce the data having been so far recorded.

In this embodiment, the second threshold is set at a value that can record, after data record interruption, management information about all the data having been recorded before the interruption. Accordingly, even where there is necessity of suspending data recording, management information can be positively recorded. Therefore, the data recorded before interruption is possible to reproduce.

In another embodiment of the invention, a signal recording apparatus further comprises a determining means. The determining means, when recording of data is started in the signal recording apparatus, determines whether in waiting for data write or in writing data. Also, the second threshold includes a third threshold for a case of in waiting for writing data and a fourth threshold for a case of in writing data. Consequently, the interruption means finishes recording of the data when the voltage value during waiting for data writing is lower than the third threshold. Also, if the voltage value during data writing is lower than the fourth threshold, data recording is interrupted. In this manner, determination whether or not recording is possible to continue is made based on a different threshold depending on during data writing or in waiting for data writing. This makes determination higher in accuracy. It is therefore possible to effectively use the battery.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flowchart showing one part of processing by system control microcomputer shown in the FIG. 1 embodiment.

DETAILED DESCRIPTION OF THE PREFERRED EMBODIMENTS

Figure 1:
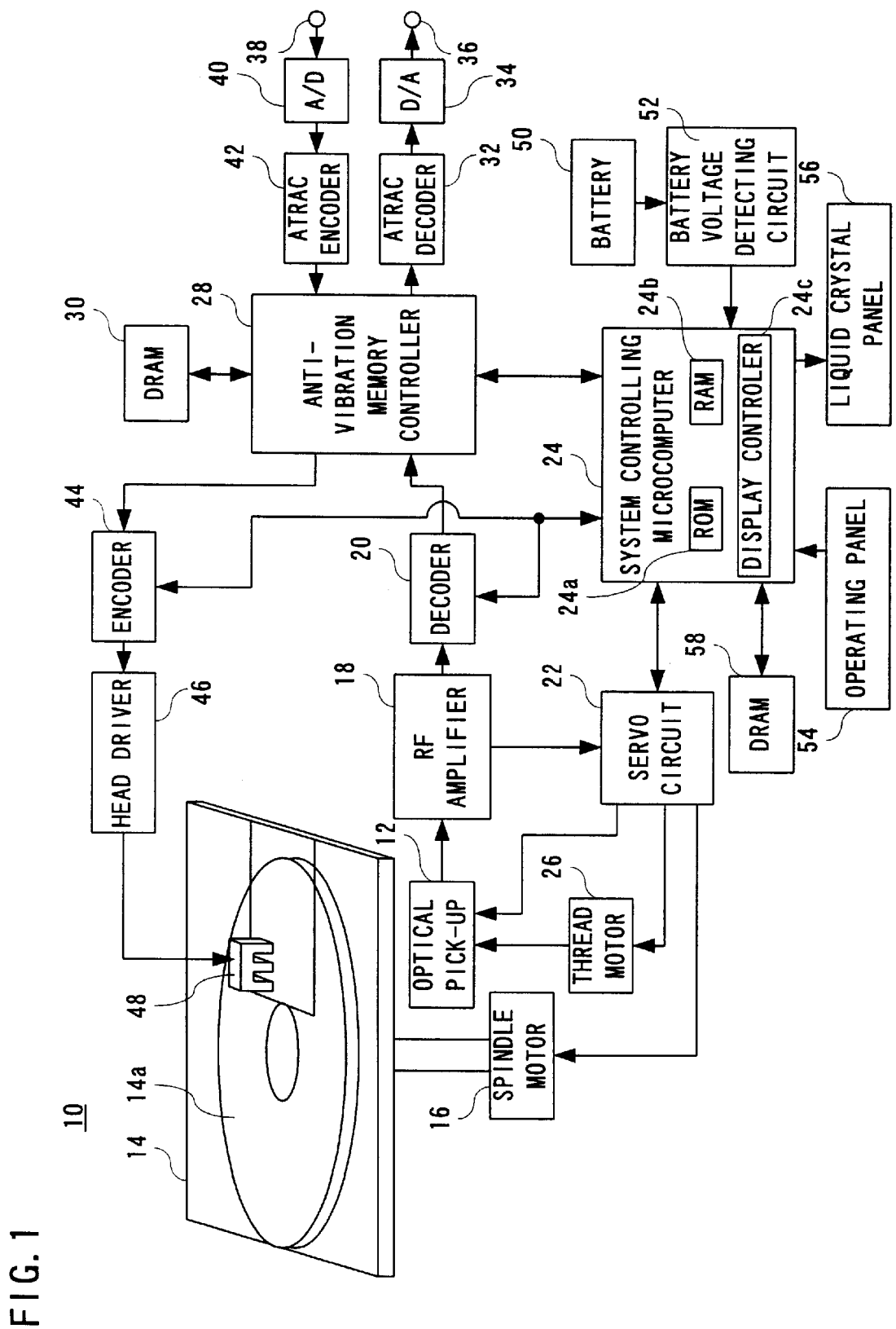
FIG. 1 is an illustrative view showing one embodiment of the present invention.

Referring to FIG. 1, a signal recording apparatus 10 of this embodiment includes an optical pick-up 12. The optical pick-up 12 irradiates laser light to a backside of a disk 14a loaded on a mini-disk (MD) 14. Then, the optical pick-up 12 determines an N-pole or S-pole on a magnetic surface from a polarization plane of the reflection light from the disk 14a, and extracts a signal (audio signal) recorded on the disk 14a. Meanwhile, the disk 14a is rotatively driven by a spindle motor 16. The audio signal extracted through the optical pick-up 12 is supplied to an RF amplifier 18. The RF amplifier 18 amplifies the audio signal, and the amplified audio signal is delivered to a decoder 20 and to servo circuit 22. The decoder 20 subjects the audio signal given from the RF amplifier 18 to processing, such as decoding for error correction (parity error and interleave) and EFM (Eight to Fourteen Modulation) demodulation.

The servo circuit 22 controls the spindle motor 16 to rotate based on the audio signal given from the RF amplifier 18 and according to an instruction by a system control microcomputer (syscon) 24. The servo circuit 22 also controls rotation of a thread motor 26 so that the optical pick-up 12 can be moved in a radial (thread) direction of the disk 14a. Furthermore, the servo circuit 22 controls such that a lens (not shown) provided on the optical pick-up 12 can correctly trace over a track (not shown) provided on the disk 14a. That is, the servo circuit 22 performs control of tracking servo and focus servo, according to an instruction given by the syscon 24.

The audio signal passed through the decoder 20 is stored to a DRAM 30, according to an instruction by an anti-vibration memory controller 28. The audio signal stored on the DRAM 30 is read out at a constant data rate according to an instruction by the anti-vibration memory controller 28 and then supplied to an ATRAC (Adaptive Transform Acoustic Coding) decoder 32, under control of the syscon 24. The ATRAC decoder 32 demodulates (decompresses) the compressed audio signal by an ATRAC scheme. The decompressed audio signal is supplied to a D/A converter 34. Thus, the audio signal as digital signal is converted into an analog signal to be outputted through an output terminal 36. In this manner, the signal recorded on the disk 14a is reproduced.

Incidentally, upon loading the MD 14, the TOC (Table Of Contents) information stored on the disk 14a is read out by the optical pick-up 12. This TOC information is stored into a RAM 24b according to an instruction by the anti-vibration memory controller 28. The syscon 24 reproduces an audio signal based on the TOC information. The TOC information includes such information as music piece count (file count), absolute time of recorded music pieces and absolute time of unrecorded region.

Meanwhile, an audio signal as analog data inputted onto an input terminal 38 is converted into digital data by an A/D converter 40 and supplied to an ATRAC encoder 42. The ATRAC encoder 42 encodes (compresses) the digital data of audio signal by an ATRAC scheme. The compressed audio signal is stored to the DRAM 30 according to the anti-vibration memory controller 28, under control of the syscon 24. The DRAM 30 is used as a buffer memory. The audio signal is controlled in time axis by the anti-vibration memory controller 28 and DRAM 30. That is, in order to record the audio signal to the disk 14a, the syscon 24 sends, as required, a read instruction to the anti-vibration memory controller 28. Accordingly, the audio signal stored on the DRAM 30 is read out in a burst fashion. The audio signal read out by the anti-vibration memory controller 28 is supplied to an encoder 44 where the encoder 44 performs encoding for error correction (parity addition and interleave processing), EFM coding, etc. on the signal.

The audio signal processed by the encoder 44 is given to head drive circuit 46. The head drive circuit 46 is connected to a magnetic head 48 so that it drives the magnetic head 48 to apply a modulation magnetic field to the disk 14a depending on the audio signal given from the encoder 44. Thereupon, the optical pick-up 12 is moved oppositely to the magnetic head 48 whereby thermomagnetic recording is made by a modulation magnetic field applied from the magnetic head 48 and the laser light given through the optical pick-up 12. During recording an audio signal, the syscon 24 forms TOC information about the audio signal by using the RAM 24b, in accordance with a situation of processing of the encoder 44. The signal recording apparatus 10, when completing the audio signal recording, makes sound recording finish after recording the TOC information.

Furthermore, the signal recording apparatus 10 includes a battery (secondary battery) 50, and is driven on power supplied from the battery 50. The battery 50 is connected with a battery voltage detector circuit 52. The battery voltage detector circuit 52 detects a voltage value of the battery 50. The voltage value detected by the battery voltage detector circuit 52 is supplied to the syscon 24. The syscon 24 controls to record an audio signal to the disk 14a, based on a voltage value given from the battery voltage detector circuit 52.

That is, when a record button (not shown) provided on an operation panel 54 is pressed, the syscon 24 detects a voltage value given from the battery voltage detector circuit 52. The syscon 24 compares this voltage value with a record-starting threshold A (6.5 V in this embodiment) record on the ROM 24a. Incidentally, the threshold A is a value empirically obtained, and is set at a value that can record 160-minute monaural audio signals together with TOC information for managing the audio signals to the disk 14a. For 160 ms, detection is made on voltage values given from the battery voltage detector circuit 52. The detected voltage values are delivered to the DRAM 58. The syscon 24 makes an average on the voltage values over the time period of 160 ms, and then compares the averaged voltage value with the threshold A. In this embodiment, the voltage values for the time period 160 ms are averaged for thee purpose of absorbing errors of detection in voltage values.

When the averaged voltage value is equal to or higher than the threshold A, the syscon 24 starts recording audio signals. On the other hand, when the averaged voltage value is lower than the threshold A, a display controller 24c displays insufficiency of a battery 50 remaining capacity on a liquid crystal panel 56, according to an instruction by the syscon 24. That is, the syscon 24, when determining sound recording is impossible to record on one disk 14a, gives a caution of an insufficient remaining capacity of the battery 50 without performing sound-record operation. Accordingly, an operator is allowed to do sound recording again after the battery 50 has been charged or exchanged. It is noted that an AC adapter (not shown) may be used in order to supply commercially-available power. Therefore, it is possible to prevent recording from finishing during the recording due to insufficient remaining capacity of the battery 50.

When sound recording is started, an audio signal is given to the input terminal 38 and recorded onto the disk 14a through the processing as described above. Meanwhile, the syscon 24, during also sound-recording an audio signal, detects voltage values given from the battery voltage detector circuit 52, and determines whether sound recording is possible to continue or not based on a detection result.

Explaining in greater detail, the syscon 24 determines whether or not the disk 14a is now under audio signal writing. In a state that the disk 14a is not being written by an audio signal (write waiting state), e.g., even during sound recording when the optical pick-up 12 or magnetic head 48 is in a moving state or the DRAM 30 is now undergoing writing by an audio signal, the voltage value is higher than that upon actually writing an audio signal (at a maximum output). Accordingly, the syscon 24 determines whether or not writing is possible to continue, based upon a threshold B (5.5 V) higher than a threshold C at a maximum output, hereinafter described. Incidently, the threshold B is an empirically obtained value and stored within the ROM 24a. In this case, an average value over a time period of 160 ms is used for a voltage value obtained from the battery voltage detector circuit 52. The syscon 24 determines that recording is possible to continue when the average voltage value is equal to or higher than the threshold B. However, when the average voltage value is lower than the threshold B, determination is made that recording is impossible to continue. In the case of a determination that recording is impossible to continue, the TOC information formed in the RAM 24b is recorded onto the disk 14a thus finishing the recording.

On the other hand, where sound recording is continuing and the disk 14a is now being written by an audio signal, the syscon 24 compares the threshold C recorded in the ROM 24a (4.5 V in this embodiment) with the averaged voltage value. That is, when the disk 14a is now undergoing writing by an audio signal, the optical pick-up 12 is radiating laser light and accordingly the disk recording apparatus 10 assumes a maximum of load. Consequently, the battery 50 is maximum in output. Accordingly, the syscon 24 determines whether or not it is possible to continue recording, based on a comparison between the averaged voltage value and the threshold C lower than the threshold B. Incidently, the threshold C is also an empirically obtained value and stored within the ROM 24a. When the averaged voltage value is equal to or greater than threshold C, the determination is that it is possible to continue sound recording. However, where the averaged voltage value is lower than the threshold C, determination is made that it is impossible to continue sound recording. In the case of determination that it is impossible to continue recording, the TOC information formed in the RAM 24b is recorded onto the disk 14a thus finishing sound recording.

In this manner, the threshold B and threshold C are set at respective values such that, after the syscon 24 has determined that it is impossible to continue recording, the TOC information can be recorded to the disk 14a, thereby finishing the recording.

The syscon 24 provides processing on the operations as described above, according to a flowchart shown in FIG. 2. When the main power is turned on to the signal recording apparatus 10, the process is started. In step S1 it is determined whether or not the sound record button is pressed or not. If "NO" in step S1, it is determined that the sound record button is not pressed and the process returns directly to step S1. On the other hand, if "YES" in step S1, it is determined that the sound record button is pressed. In step S3 a voltage value of the battery 50 is detected and an average value of the voltage values for 160 ms is calculated. In the succeeding step S5, it is determined whether an averaged voltage value is equal to or higher than the threshold A or not. If "YES" in step S5, it is determined that recording is possible to start. In step S7 sound recording is started. On the other hand, if "NO" in step S5, it is determined that starting of recording is impossible to stat. In step S9 a caution is given of an insufficient remaining capacity of the battery 50, ending the process.

In step S11 it is determined whether or not recording of an audio signal has ended. If "YES" in step S11, it is determined that recording of an audio signal has finished, and the process advances to step S21. On the other hand, if "NO" in step S11, it is determined that audio signal recording has not yet finished, and in step S13 a battery 50 voltage value is detected to calculate an average value of the voltage values for 160 ms. In the succeeding step S15 it is determined whether or not the disk 14a is undergoing writing by an audio signal. If "NO" in step S15, determination is as in-waiting for data write and then in step S17 it is determined whether or not the averaged voltage value is equal to or higher than the threshold. If "YES" in step S17, it is determined that recording is possible to continue and the process returned to step S11. On the other hand, if "NO" in step S17, it is determined that recording is impossible to continue and the process proceeds to step S21.

If "YES" in step S15, it is determined that the disk 14a is being written by an audio signal, and it is determined in step S19 whether or not the averaged voltage value is equal to higher than the threshold C. If "YES" in step S19, it is determined that sound recording is possible to continue, returning to step S11. On the other hand, if "NO" in step S19, it is determined that recording is impossible to continue, advancing to step S21. In step S21 the TOC information for managing the audio signal is recorded in the disk 14a, thus ending the process.

According to this embodiment, recording of an audio signal is made after determining whether or not recording is possible to start. It is therefore possible to prevent recording from finishing in the course thereof due to insufficiency of a battery remaining capacity. Meanwhile, because, during sound recording, the capability of continuing recording is determined using two thresholds depending upon a writing situation, thus enabling determination based upon an accurate battery remaining capacity. Furthermore, even where recording should be ended in the course thereof due to an insufficient battery remaining capacity, the recording is finished after recording the TOC information for managing the audio signals so far recorded. Thus, it is possible to positively reproduce the recorded audio signals.

Incidentally, in this embodiment the threshold A has been set at such a value that 160 minutes of monaural audio signals together with TOC information for managing the audio signals can be recorded to the disk 14a. Alternatively, the threshold A may be freely set depending on an unused region (recordable time) on the disk 14a.

Although this embodiment shows a signal recording apparatus using MD, it is needless to say that the invention is applicable also to a single recording apparatus using MO, DVD, CD-R, CD-RW or IC cards.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal recording apparatus to be driven by a battery and to record one or more of data and management information for managing the data to a recording medium, comprising:

a detecting means for detecting a voltage value of said battery;

a first comparing means for comparing a detection result of said detecting means with a first threshold at which a start of recording is possible;

a second comparing means for comparing a detection result of said detecting means with a second threshold at which continuation of recording is possible;

a record starting means for starting to record the data depending upon a comparison result of said first comparing means; and a record continuing means for continuing to record the data depending upon a comparison result of said second comparing means, wherein said second threshold is a value that can record, after the data is interrupted for recording, management information about all the data having been recorded before the interruption.

2. A signal recording apparatus according to claim 1, further comprising a caution means for giving a caution of remaining capacity insufficiency of said battery when the detection result is lower than the first threshold.

3. A signal recording apparatus according to claim 2, wherein the first threshold is a value that makes it possible to complete recording to said recording medium.

4. A signal recording apparatus according to claim 1, further comprising:

an interruption means for suspending data recording when the detection result is lower than the second threshold; and a first management information recording means for recording, when the data is interrupted of recording, management information about all the data having been recorded before the interruption.

5. A signal recording apparatus according to claim 4, further comprising a determining means to determine whether in waiting for writing data to said recording medium or in writing of data to said recording medium, wherein the second threshold includes a third threshold for a case of in waiting for data writing and a fourth threshold for a case of during data writing, and said interruption means finishing recording the data when the detection result of during data writing is lower than the third threshold and finishing recording the data when the detection result of in waiting for data writing is lower than the fourth threshold.

6. A signal recording apparatus according to claim 4, further comprising a second management information recording means for recording, when recording of the data has been completely finished management information about all the data having been recorded before the complete finishing.

* * * * *